United States Patent
Petersmann (10) Patent No.: US 9,702,427 B2
(45) Date of Patent: Jul. 11, 2017

(54) DAMPER DEVICE

(71) Applicant: JOSEPH VOEGELE AG, Ludwigshafen/Rhein (DE)

(72) Inventor: Eckhard Petersmann, Hagen (DE)

(73) Assignee: JOSEPH VOEGELE AG (DE)

( * ) Notice: Subject to any disclaimer, the term of this patent is extended or adjusted under 35 U.S.C. 154(b) by 24 days.

(21) Appl. No.: 14/683,497

(22) Filed: Apr. 10, 2015

(65) Prior Publication Data

US 2015/0292592 A1    Oct. 15, 2015

(51) Int. Cl.
| | |
|---|---|
| *E01F 13/00* | (2006.01) |
| *F16F 9/52* | (2006.01) |
| *F16F 9/19* | (2006.01) |
| *E01C 19/48* | (2006.01) |
| *F16F 9/02* | (2006.01) |

(52) U.S. Cl.
CPC ............... *F16F 9/52* (2013.01); *E01C 19/48* (2013.01); *F16F 9/0209* (2013.01); *F16F 9/19* (2013.01); *E01C 2301/04* (2013.01); *E01C 2301/08* (2013.01)

(58) Field of Classification Search
CPC .. E01C 19/48; E01C 2301/04; E01C 2301/08; F16F 9/19; F16F 9/52; F16F 9/0209
USPC ............................. 404/83, 96–118; 14/23, 78
See application file for complete search history.

(56) References Cited

U.S. PATENT DOCUMENTS

| | | | | |
|---|---|---|---|---|
| 3,128,858 A | * | 4/1964 | Kumezawa | B60M 1/234 191/41 |
| 4,323,145 A | * | 4/1982 | Allen | B23D 47/005 181/209 |
| 4,955,754 A | * | 9/1990 | Smith | B60D 3/00 293/134 |
| 5,004,394 A | | 4/1991 | Goodwin et al. | |
| 5,100,277 A | * | 3/1992 | Musil | E01C 19/48 404/108 |
| 7,431,134 B2 | * | 10/2008 | Ansel | F16F 9/0209 188/269 |

(Continued)

FOREIGN PATENT DOCUMENTS

| | | |
|---|---|---|
| CN | 1920328 A | 2/2007 |
| CN | 201513514 U | 6/2010 |

(Continued)

OTHER PUBLICATIONS

Japanese Office Action Application No. 2015-077139 Dated: Jan. 26, 2016, English Translation.

(Continued)

*Primary Examiner* — Raymond W Addie
(74) *Attorney, Agent, or Firm* — Brooks Kushman P.C.

(57) ABSTRACT

A damper device comprises a cylinder, a piston bearing on one side of the cylinder, a piston rod displaceably received by the piston bearing, and a bottom unit on another side of the cylinder. The cylinder, the piston bearing and the bottom unit form a closed chamber that is filled with a compressible liquid. The piston rod subdivides the chamber into first and second chamber halves between which the liquid can be displaced if the piston rod is displaced relative to the cylinder. Furthermore, the closed chamber provides for a variable volume so as to compensate temperature-induced pressure fluctuations inside the closed chamber.

20 Claims, 10 Drawing Sheets

(56) References Cited

U.S. PATENT DOCUMENTS

| | | | |
|---|---|---|---|
| 9,097,309 B2* | 8/2015 | Fujiu | F16F 15/04 |
| 2007/0045916 A1 | 3/2007 | Ansel et al. | |
| 2008/0018030 A1 | 1/2008 | Kiriyama | |
| 2010/0329784 A1* | 12/2010 | Mahlberg | F16F 15/1442 404/112 |
| 2011/0277252 A1* | 11/2011 | Stubler | E01D 19/16 14/22 |
| 2012/0299270 A1* | 11/2012 | Buschmann | E01C 19/48 280/481 |
| 2013/0322965 A1 | 12/2013 | Frelich et al. | |
| 2015/0292592 A1 | 10/2015 | Petersmann | |

FOREIGN PATENT DOCUMENTS

| | | |
|---|---|---|
| CN | 204692434 U | 10/2015 |
| DE | 2243076 A1 | 3/1974 |
| DE | 102011120161 A1 | 6/2013 |
| EP | 0667415 A1 | 8/1995 |
| EP | 1734276 A2 | 12/2006 |
| EP | 1881227 A2 | 1/2008 |
| EP | 2295641 A2 | 3/2011 |
| EP | 2527534 A1 | 11/2012 |
| GB | 1414586 A | 11/1975 |
| GB | 2308421 A | 6/1997 |
| JP | S50-083488 U | 12/1973 |
| JP | H05133431 A | 5/1993 |
| JP | 08014308 A | 1/1996 |
| JP | 08014308 A | 1/1996 |
| JP | 2006349182 A | 12/2006 |
| JP | 2006349182 A | 12/2006 |
| JP | 2008045738 A | 2/2008 |
| JP | 2008045738 A | 2/2008 |
| JP | 2009019642 A | 1/2009 |

OTHER PUBLICATIONS

Japanese Office Action Dated Jan. 26, 2016, Application No. 2015-077139, Dispatch No. 026180, 7 Pages.
Chinese Office Action Dated Aug. 30, 2016, Application No. 201510123016.6, 7 pages.
Extended European Search Report, Letter indentifiers that indicate relevance of the cited documents.
European Search Report Dated Oct. 16, 2014, Application No. EP 14164376.7-1755, Applicant Joseph Vöegele AG, 7 Pages.
Japanese Office Action Dated Nov. 24, 2016, Application No. 2016-015840, Appeal No. 2015-077139, 2 pages.

* cited by examiner

DAMPER DEVICE

CROSS-REFERENCE TO RELATED APPLICATIONS

This application claims foreign priority benefits under 35 U.S.C. §119(a)-(d) to European patent application number EP 14164376.7, filed Apr. 11, 2014, which is incorporated by reference in its entirety.

TECHNICAL FIELD

The present disclosure relates to a damper device.

BACKGROUND

It is known from practice, and for instance from EP 0 667 415 A1, that certain automotive building machines, e.g., road finishers or chargers, have to be supplied with material during their operation. This process, which is called charging, is carried out during the driving operation, for instance by a truck driving backwards and approaching the road finisher or charger, which moves forwards at the same time, and tipping the material from its load area into the material hopper of the road finisher or charger. While the charging takes place the truck is pushed forward by the road finisher or charger.

It is furthermore known that, for charging purposes, the truck docks to a push-bar of the road finisher or charger so as to position its load platform above the material hopper such that no material gets lost during the unloading. To prevent the road finisher or charger from being abruptly dislocated backwards on the ground during the docking of the truck, respectively, while the truck is pushed forward the push-bar is conventionally mounted in a resilient, respectively, damping fashion.

A road finisher having a docking unit is disclosed, for example, in DE 10 2011 120 161 A1. Seen in the driving direction, the docking unit is provided in the front, underneath the material hopper. The docking unit comprises a push-bar which is resiliently mounted by means of elastomeric profile dampers. The drawback thereof is the fact that the elastomeric profile dampers become hard and brittle in the course of time so that in particular the damping characteristic of the docking unit changes in an undesirable manner.

Documents U.S. Pat. No. 5,004,394 A and EP 2 295 641 A2 each disclose a road finisher comprising a docking unit. The push-bar of the docking unit is supported by two controllable hydraulic cylinders. The respective hydraulic cylinders are coupled, on opposite sides of the piston, to a hydraulic system provided in the road finisher. The respective pistons of the hydraulic cylinders can thus be shifted between a moved in and a moved out position by externally introducing a hydraulic fluid into the hydraulic cylinders. The disadvantage thereof is the fact that the connection of the respective hydraulic cylinders to the hydraulic system of the road finisher is cost-intensive, and the hydraulic lines connected to the hydraulic cylinders require plenty of space on the road finisher.

Moreover, additional electronic components are required on the road finisher for controlling the hydraulic system, viz. positioning the respective hydraulic cylinders as desired, thus increasing the production costs.

A bumper for motor vehicles is disclosed in DE 2 243 076 A. The bumper includes a first and second damper connected to each other crosswise by means of hydraulic lines, allowing hydraulic fluid to be displaced from a piston rod side of the first damper into the piston side of the second damper, and hydraulic fluid to be displaced from the piston side of the first damper into the piston rod side of the second damper. The respective dampers further comprise a dividing piston delimiting a gas space in the damper and serving to compensate a volume change. The respective dampers are further connected to a regeneration system externally supplying a hydraulic fluid to the dampers so as to move the dampers back into an initial position after an impact. The disadvantage thereof is the fact that connecting the dampers to one another, and coupling the respective dampers to the hydraulic regeneration system, requires plenty of space in the motor vehicle. At the same time, there is a great need for maintenance and servicing.

EP 2 527 534 A1 discloses a road finisher comprising a push-bar which is carried by a damper. The damper includes a friction spring the damping rate of which during the spring compression differs from that during the spring release.

SUMMARY

A damper device according to the present disclosure may have a simple constructive means, which overcomes the disadvantages described above in connection with the prior art and, in particular, which is characterized by a substantially constant damping characteristic, even when exposed to greater temperature fluctuations at the operating site.

According to the disclosure, the closed chamber has a variable volume so as to compensate temperature-induced pressure fluctuations inside the closed chamber. This means that the closed chamber is configured to adapt itself to a temperature-induced volume increase or volume reduction of the compressible liquid enclosed therein, so that it is thus possible to achieve an almost constant force characteristic (damping characteristic) for the damper device regardless of the temperature of the enclosed liquid. The damper device according to the disclosure furthermore has the advantage that it allows a compact production thereof and, therefore, is ideal for use on vehicles, in particular automotive building machines, e.g., road finishers or chargers. This is, above all, due to the fact that the damper device according to the disclosure constitutes a damping system that is self-contained, which need not be additionally coupled to a hydraulic system. According to the disclosure, therefore, the compressible liquid always remains in the closed chamber, meaning that the closed chamber is not connected to an external hydraulic system. While the damping effect in known hydraulic systems can be realized by the hydraulic system connected to the hydraulic cylinders, e.g., by throttles, the damper device according to the disclosure itself permits the damping effect. Thus, the damper device according to the disclosure can be inexpensively retrofitted to a road finisher or a charger, or can be removed from same for maintenance and servicing purposes.

Preferably, the bottom unit comprises a bulkhead which is displaceably arranged inside the cylinder. In this embodiment, the variable volume of the closed chamber is directly associated with the position of the bulkhead inside the cylinder. The bulkhead provides for a simple means allowing to compensate a pressure change of the compressible liquid enclosed in the chamber, caused either by moving the piston rod in and/or by a temperature-induced volume change of the liquid, namely by pressing it further into the cylinder so as to increase the volume of the closed chamber, or by displacing it towards the piston bearing so as to reduce the volume of the closed chamber.

According to an advantageous modified embodiment of the disclosure the bottom unit comprises a lid and a spring element, the spring element being arranged between the lid and the bulkhead. Thus, a particularly compact design is obtained for the bottom unit, the spring element being able to buoyantly hold the bulkhead, against the pressure of the enclosed compressible liquid, in a desired position inside the cylinder.

It is particularly advantageous if the bulkhead comprises an end section and a guiding section, the guiding section having a greater outer diameter than the end section. This allows the end section to be seated on the spring element of the bottom unit in a particularly stable manner. Ideally, the spring element surrounds, at least partially, the end section of the bulkhead so as to stably support the bulkhead inside the cylinder.

Also, it is useful if the bulkhead provides a seat between the end section and the guiding section against which the spring element rests. This ensures that the bulkhead can be stably guided by the spring element in the linear direction inside the cylinder.

When used in particular on a road finisher or a charger, where great forces may act on the damper device, it is sensible if the spring element comprises at least one disc spring. Although the disc spring can absorb great forces it merely requires a small installation space. To extend the spring range it is possible that the spring element comprises a plurality of disc springs so as to form a spring stack. The spring stack may include individual disc springs arranged relative to each other in an opposite direction, and/or several spring packs arranged relative to each other in an opposite direction each comprising several disc springs arranged in the same direction on top of each other, so as to provide for a greater spring range, respectively, a desired spring rate.

In another embodiment of the disclosure the bulkhead is mounted relative to the cylinder in a non-rotating manner, meaning that the bulkhead is linearly displaceable inside the cylinder, but cannot be rotated relative to the cylinder. This can be accomplished, for example, by a guide along which the bulkhead can be displaced linearly inside the cylinder. For example, a groove-spring connection could be provided as such a guide between the cylinder and the bulkhead.

It is also advantageous if the bulkhead is concave towards the interior of the chamber, i.e., is formed as a hollow body defining a part of the chamber volume of the damper device. Thus, it is possible to create a greatest possible damping volume for the closed chamber without enlarging the damper device. The compressible liquid received in the hollow body further ensures in an advantageous manner that the bulkhead, formed as a hollow body, is uniformly displaceable inside the cylinder, even if great forces act on the piston rod. In addition, the form of the bulkhead as a hollow body has a favorable effect on sealing the closed chamber relative to the bottom unit because the compressible liquid presses against the inner surface of the hollow body, outwardly against the cylinder.

Preferably, a piston plate is attached inside the cylinder, between the piston bearing and the bottom unit on the piston rod. The piston plate forms a displaceable partition wall between both chamber halves and preferably includes at least one throttling port so as to ensure a displacement of the compressible liquid between the two chamber halves if the piston rod is displaced relative to the cylinder.

In particular, the moving in behavior and the readjustment behavior of the piston rod can be precisely adjusted by arranging a valve member in at least one of the throttling ports. In particular, this valve member is a ball check valve, which opens, thus ensuring that the compressible liquid flows there through when the piston rod moves into the cylinder, respectively, which closes when the piston rod automatically returns from a moved in position into the initial position. This allows an excellent control of the damping property of the damper device in the desired fashion.

It has been found that the damper device is usable for damping great forces and at relatively great temperature fluctuations particularly if the compressible liquid is a silicone. A silicone has excellent elastic compression properties and is easily shiftable between the two chambers if a push-in force acts on the piston rod or is removed from same. Moreover, the silicone ensures that the piston rod automatically returns to its initial position as soon as the force acting on the piston rod drops below a predetermined force threshold.

To accelerate an automatic readjustment of the piston rod to the initial position the compressible liquid enclosed in the chamber is subjected to a predetermined pressure. Thus, the piston rod can be pretensioned relative to the piston bearing in a desired initial position. Thus, it is possible, for example, to return a push-bar of a road finisher or a charger, which is carried by the piston rod, automatically, i.e., without additional hydraulic control, into its initial position when a pressing force is removed from the push-bar, i.e., when the truck drives away after the charging.

In another advantageous modified embodiment of the disclosure the cylinder and/or the bottom unit comprises a vent hole through which air can be displaced, respectively, can flow in from the/into the bottom unit when the bulkhead is displaced. This entails that no air is enclosed in the bottom unit, forming an air cushion which affects the damping characteristic.

The damper device according to the disclosure is excellently usable in a road finisher or a charger, in particular a road finisher or charger comprising a material hopper and at least a damper device according to the disclosure which is fixed to the chassis of the road finisher or charger and carries a push-bar to which a material supply vehicle can be docked in order to fill up the material hopper.

An advantageous embodiment of the disclosure will be explained in more detail with reference to the attached drawings.

BRIEF DESCRIPTION OF THE DRAWINGS

In the figures like components are designated with like reference numbers.

DETAILED DESCRIPTION

As required, detailed embodiments are disclosed herein; however, it is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
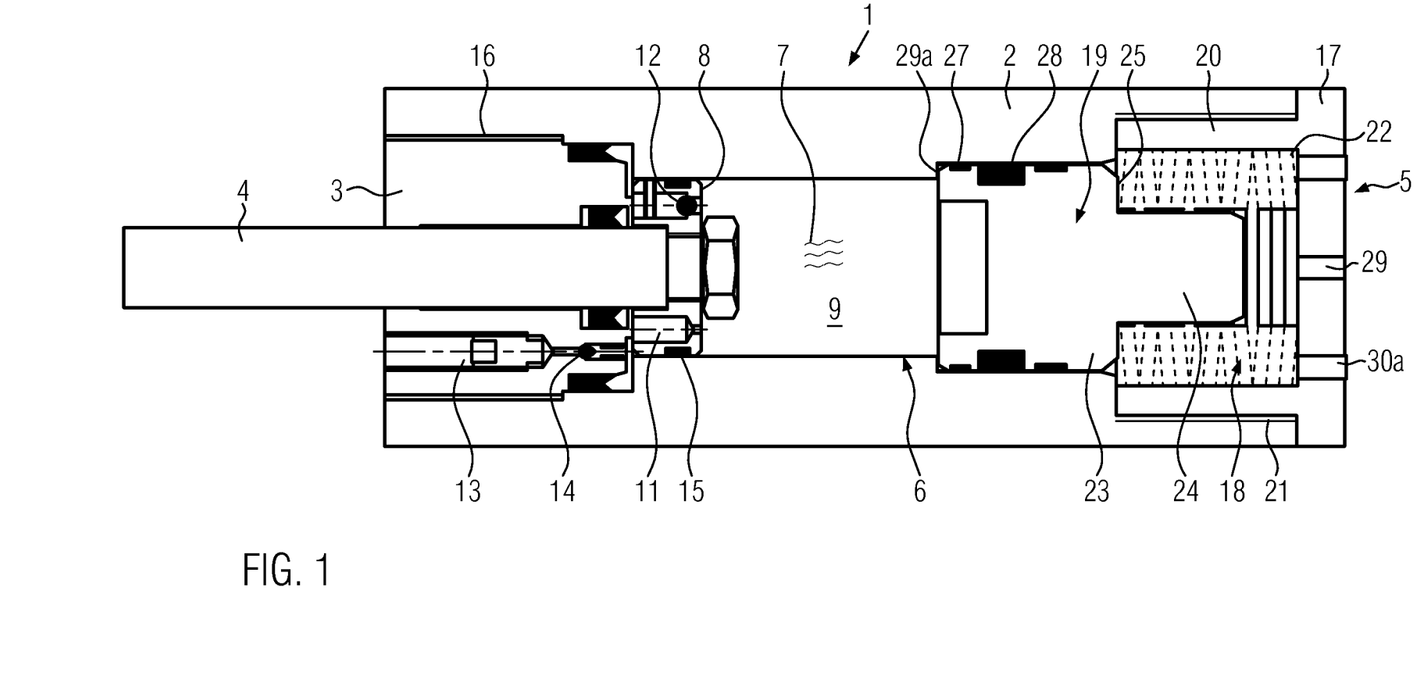
FIG. 1 shows a damper device according to the disclosure in a relaxed state.

FIG. 1 shows a sectional view of a damper device 1 according to the disclosure. The damper device 1 has a cylinder 2 at one end of which a piston bearing 3 with a piston rod 4 arranged to be displaceable therein is attached. On the other side of the cylinder 2 a bottom unit 5 is attached. The cylinder 2 forms together with the piston bearing 2 and the bottom unit 5 a closed chamber 6 in which a compressible liquid 7 is enclosed.

At an end of the piston rod 4 projecting into the closed chamber 6 a piston plate 8 is attached. The piston rod 4, in particular the piston plate 8 arranged in same, subdivides the closed chamber 6 into a first chamber half 9 and a second chamber half 10 (see FIG. 3). The first chamber half 9 is located on a side of the piston plate 8 pointing away from the piston bearing 3. As can be easily seen in FIG. 3, the second chamber half 10 of the closed chamber 6 is located on a side of the chamber plate 8 pointing towards the piston bearing 3. According to FIG. 1, the piston rod 4 is in an initial position in which it rests against the piston bearing 3. In the initial position nearly the total compressible liquid 7 is located in the first chamber half 9.

The piston plate 8 includes two throttling ports 11, with a non-return valve 12 being arranged in one of the throttling ports 11. Thus, it is achieved that when the piston rod 4 is pushed into the cylinder 2 the compressible liquid 7 flows through both throttling ports 11 from the first chamber half 9 into the second chamber half 10, with the pressure inside the closed chamber 6 increasing. As soon as a push-in force F applied to the piston rod 4, acting on the pushed in piston rod 4, is removed the piston rod 4 returns automatically into the initial position shown in FIG. 1, with the pressure inside the closed chamber 6 dropping down again to the original pressure potential in the initial position. During the returning motion of the piston rod the compressible liquid 7 can flow back from the second chamber half 10 into the first chamber half 9 merely through the throttling port 11 in which no non-return valve 12 is arranged. The other throttling port 11 remains closed by the non-return valve 12. This leads to a decelerated, damped return of the piston rod 4 into its initial position in which the piston plate 8 of the piston rod 4 rests against the piston bearing 3.

For filling the closed chamber with the compressible liquid 7 a filling hole 13 is formed in the piston bearing 3. A valve member 14, in particular a one-way valve, for filling and enclosing the compressible liquid 7 in the closed chamber 6 is provided in the filling hole 13. Moreover, it is easily recognizable in FIG. 1 that a piston plate gasket 15 is fixed to the circumference of the piston plate 8. The piston plate gasket 15 ensures that the compressible liquid 7 flows back and forth between the two chamber halves 9, 10 merely through the throttling ports 11 if the piston rod 4 is displaced inside the cylinder 2. The damper device according to the disclosure as shown in FIG. 1 furthermore comprises a screw-thread connection 16 by means of which the piston bearing 3 is fixed to the cylinder 2. Alternatively, it would also be possible that the piston bearing 3 is formed integrally with the cylinder 2.

The bottom unit 5 illustrated in FIG. 1 comprises a lid 17, a spring element 18 and a bulkhead 19. The bulkhead 19 is buoyantly arranged in the cylinder 2 and defines a displaceable chamber boundary of the closed chamber 6. The lid 17 comprises a guiding projection 20 which is fixed to the cylinder 2 by another screw-thread connection 21. As an alternative to the screw-thread connection 21 the lid 17 could just as well be formed integrally with the cylinder 2. According to FIG. 1, the spring element 18 comprises several individual disc springs 22. As shown, these can be arranged in an opposite direction relative to each other, individually or as spring packs comprising two, three or more disc springs arranged in the same direction on top of each other. This allows an easy adjustment of the damping, respectively, resilient characteristic of the spring element 18. The disc springs 22 are, above all, suited for damping great forces and have a temperature-dependent damping characteristic.

The bulkhead 19 has a guiding section 23 and an end section 24. A seat 25 is defined between the guiding section 23 and the end section 24 which rests against the spring element 18. To improve the mounting of the bulkhead 19 on the spring element 18 the spring element 18 is arranged around the end section 24. Moreover, it can be easily seen in FIG. 1 that the spring element 18 is arranged between the end section 24 of the bulkhead 19 and the guiding projection 20 of the lid 17, by which a guide for the spring element 18 is created inside of which the spring element 18 can compress and relax in a target-oriented manner.

The bulkhead 19 further comprises at least one sealing element 27 ensuring that the compressible liquid 7 remains in the closed chamber 6. A guiding member 28 is provided between the cylinder 2 and the bulkhead 19 to obtain a non-rotating support of the bulkhead 19 inside the cylinder 2. The guiding member 28 can be, for example, a spring-groove connection.

Moreover, according to FIG. 1, a vent hole 29 is formed in the lid 17. The vent hole 29 allows air to flow into and out of the space in which the spring element 18 is located when the bulkhead 19 in the cylinder 2 moves back and forth. FIG. 1 finally shows that at least one mounting hole 30a is formed in the lid 17 into which a non-illustrated tool can be introduced to screw the lid 17 onto the cylinder 2.

In FIG. 1, the temperature of the compressible liquid 7 is +20° C. In this case, the spring element 18 is totally relaxed. In the relaxed state the spring element 18 holds the bulkhead 19 in an end position in which the bulkhead 19 rests against an optionally provided projection 29a of the cylinder 2. The piston rod 4 rests against the piston bearing 3.

Figure 2:
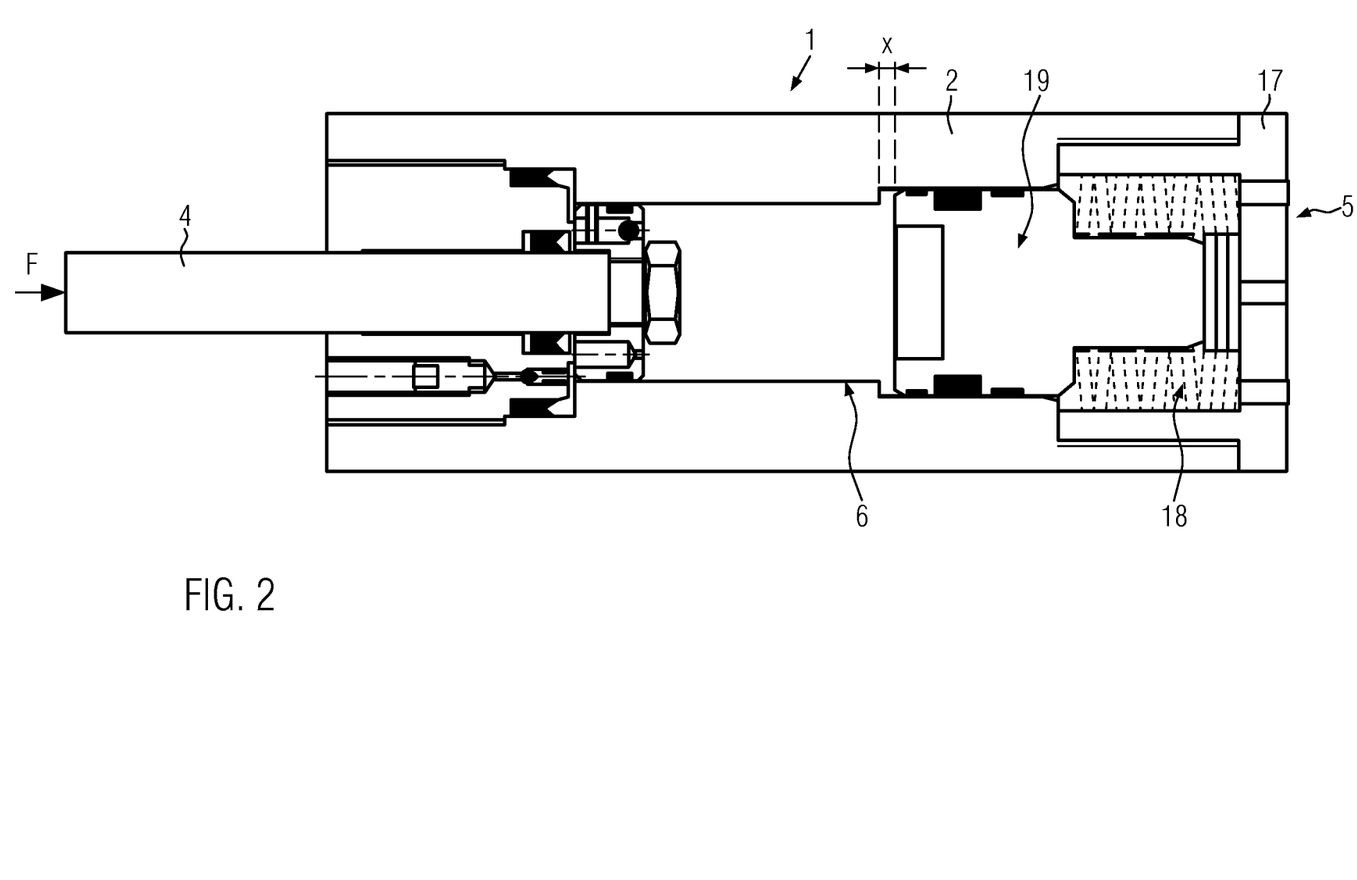
FIG. 2 shows a damper device according to the disclosure with a push-in force acting on the piston rod.

In FIG. 2, the bulkhead 19 has been positioned, from its end position according to FIG. 1, in a zero position. Relative to the end position according to FIG. 1 the bulkhead 19 is displaced by a spring travel X to the right, towards the lid 17 of the bottom unit 5. The zero position is reached by the compressible liquid 7 enclosed in the chamber 6 exerting a predetermined pressure, which simultaneously ensures that, in the initial position, the piston rod 4 rests against the piston bearing 3 in a pretensioned manner. The spring travel X amounts, for example, to 6 mm if the spring element 18 is pretensioned at 61.2 bar, which corresponds approximately to a force F of 300 daN acting on the piston rod 4 and 2700 daN acting on the bulkhead 19. If the damper device 1 is subjected to such an exemplary load the volume of the chamber 6 increases by about 26.56 cm3 to about 564.56 cm3 if the temperature of the liquid remains at +20° C.

Figure 3:
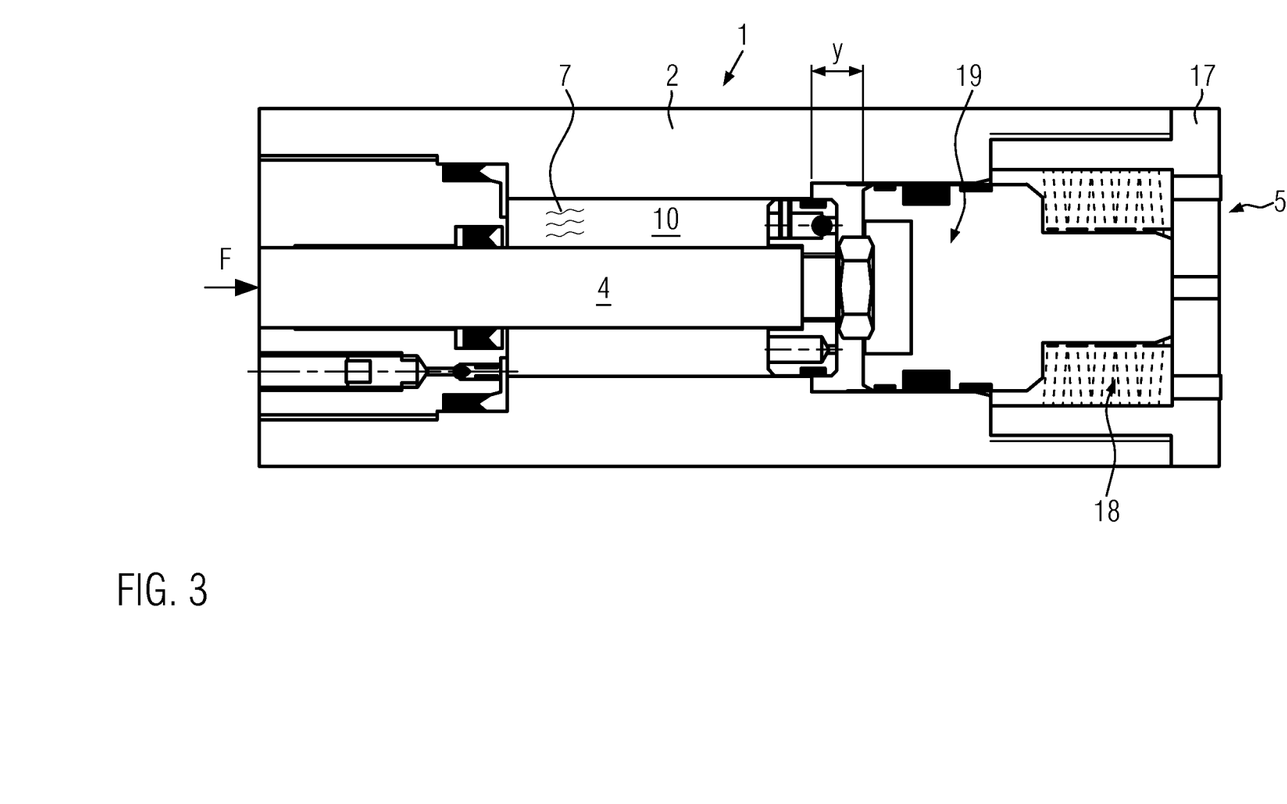
FIG. 3 shows a damper device according to the disclosure with a maximally loaded, pushed in piston rod.

FIG. 3 shows the damper device 1 in a maximum load state. The piston rod 4 is pushed into the cylinder 2 completely, e.g., 80 mm. This is obtained by a force F of about 6500 daN acting on the piston rod 4. The bulkhead 19 is, in this case, pressed by a maximum spring travel Y against the pretensioning force of the spring element 18 towards the lid 17 of the bottom unit 5. In this position the spring element 18 is subjected to a load of about 80%. The temperature of the liquid still is +20° C.

Figure 4:
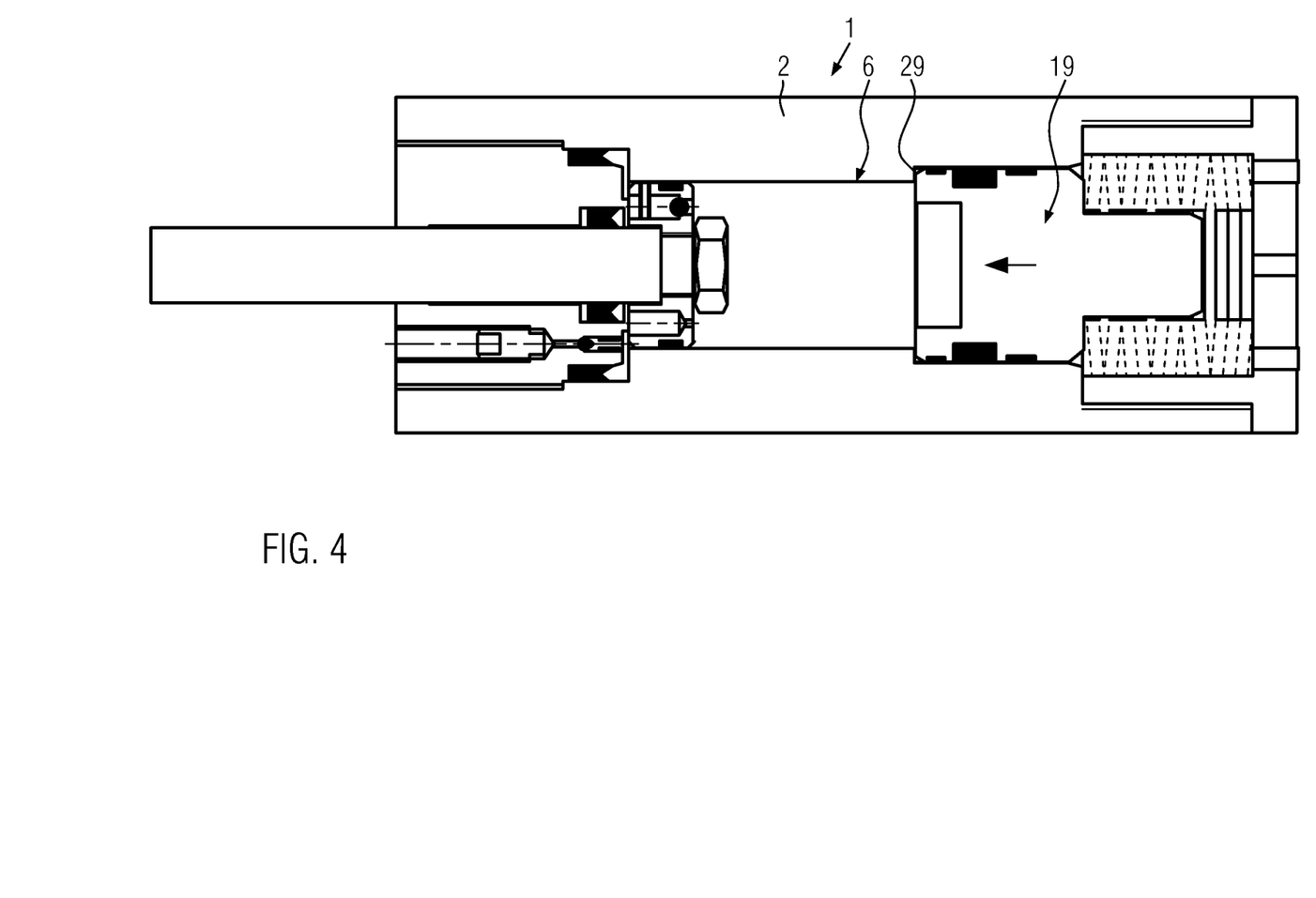
FIG. 4 shows a damper device according to the disclosure with a push-in piston force acting on the piston rod, and a chamber volume compensation realized by the buoyant bulkhead in case of a temperature drop.

Relative to FIG. 2, in which the bulkhead 19 is located in the zero position, the damper device 1 of FIG. 4 carries out a temperature-induced volume compensation. The damper device 1 according to the disclosure here takes into account a temperature drop by −30° C., so that the liquid temperature of initially +20° C. according to FIG. 22 cools down to −10° C. This temperature drop results in the shrinkage of the volume of the compressible liquid 7 enclosed in the closed chamber 6. Thus, by the pretensioning force of the spring element 18, the bulkhead 19 is moved from the zero position shown in FIG. 2 to the left in the direction of the piston rod 4 so as to adapt the volume of the chamber 6 to the shrinkage of the compressible liquid 7. As can be easily seen in FIG. 4, the bulkhead 19 then rests against the projection 29a of the cylinder again. The pretensioning force of 300 daN acting according to FIG. 2 is reduced by the volume compensation, i.e., by the relaxation of the spring element 18, to about 125 daN.

Figure 5:
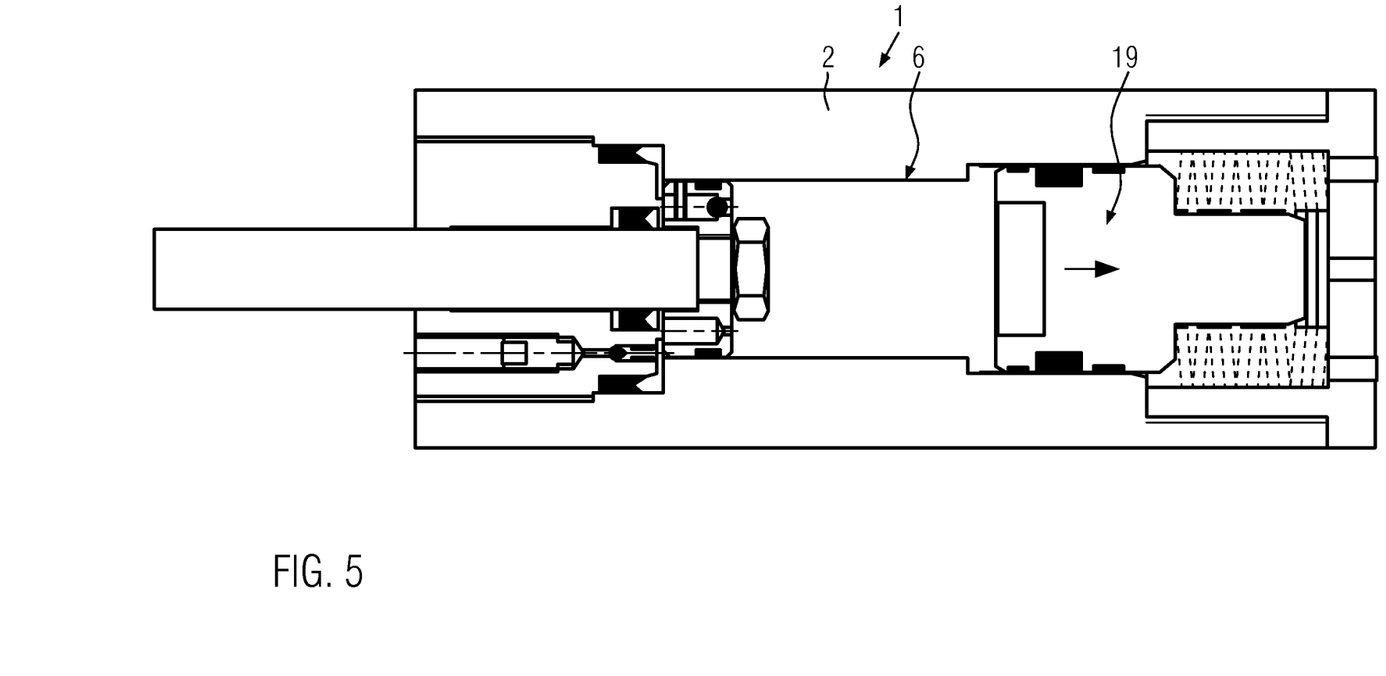
FIG. 5 shows a damper device according to the disclosure with a push-in piston force acting on the piston rod, and a chamber volume compensation in case of a temperature rise.

The damper device 1 according to the disclosure as shown in FIG. 5 carries out a volume compensation of the closed chamber 6 at a temperature rise. Again, this is realized relative to the illustrated zero position of the bulkhead 19 according to FIG. 2. In FIG. 5, the spring element 18 is pretensioned by a force F of 300 daN. At a temperature rise of +30° C. the liquid temperature initially assumed in FIG. 2 increases from +20° C. to +50° C., so that the pretensioning force F acting on the spring element 18 increases to about 400 daN. The spring element 18 is here subjected to a load of about 40%. The temperature rise by +30° C. results in the expansion of the compressible liquid 7 enclosed in the closed chamber 6 by about 16.24 cm3, which corresponds approximately to a spring travel of 3.67 mm to the right, towards the lid 17, from the zero position according to FIG. 2. The volume of the chamber 6 thus adapts to the expansion of the compressible liquid.

According to FIGS. 4 and 5, it was demonstrated that the bulkhead 19 of the damper device according to the disclosure can compensate a temperature-induced shrinkage, respectively, expansion of the compressible liquid 7 because it is arranged buoyantly in the cylinder. With the damper device 1 according to the disclosure this can be realized independently of the position of the piston rod 4 inside the cylinder 2.

Figure 6:
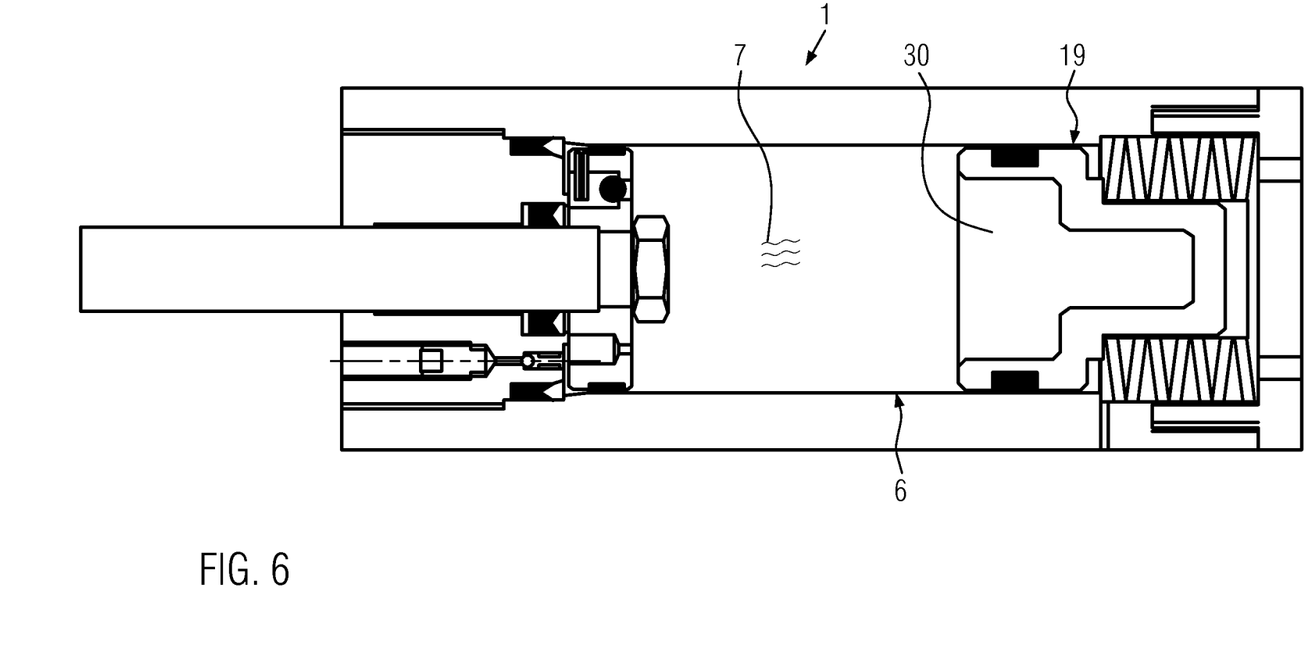
FIG. 6 shows a damper device according to the disclosure with a bulkhead formed as a hollow body.

In the damper device 1 shown in FIG. 6 the bulkhead 19 is formed as a concave body, respectively, hollow body 30. The hollow body 30 thus forms part of the volume of the enclosed chamber 6. Due to the fact that the pressure expands uniformly to the inner surface of the hollow body 30 the sealing between the hollow body 30 and the cylinder 2 is improved. By providing the hollow body 30 also the volume of the chamber 6 is increased. Thus, a greater amount of compressible liquid 7 can be received in the closed chamber 6, which may have a positive effect on the shrinkage, respectively expansion behavior of the liquid 7.

Figure 7:
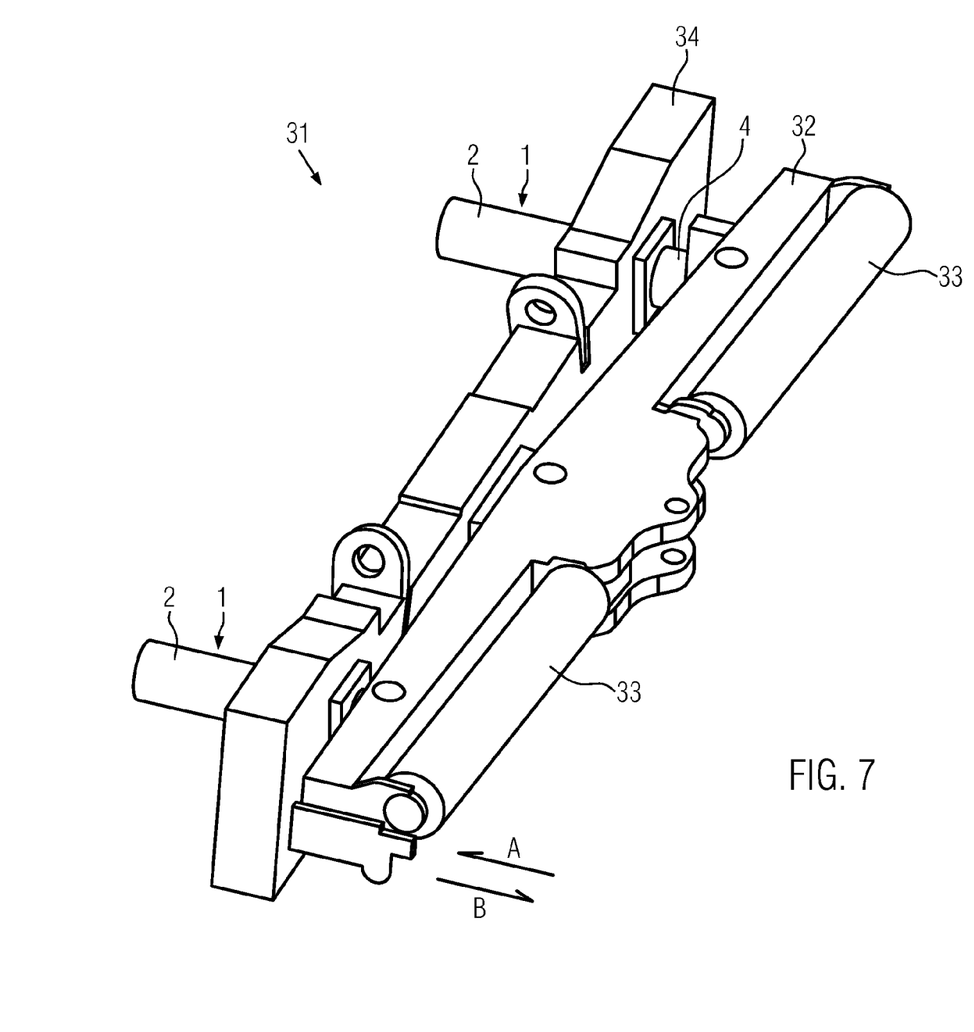
FIG. 7 shows a docking unit for a road finisher or a charger.
Figure 8:
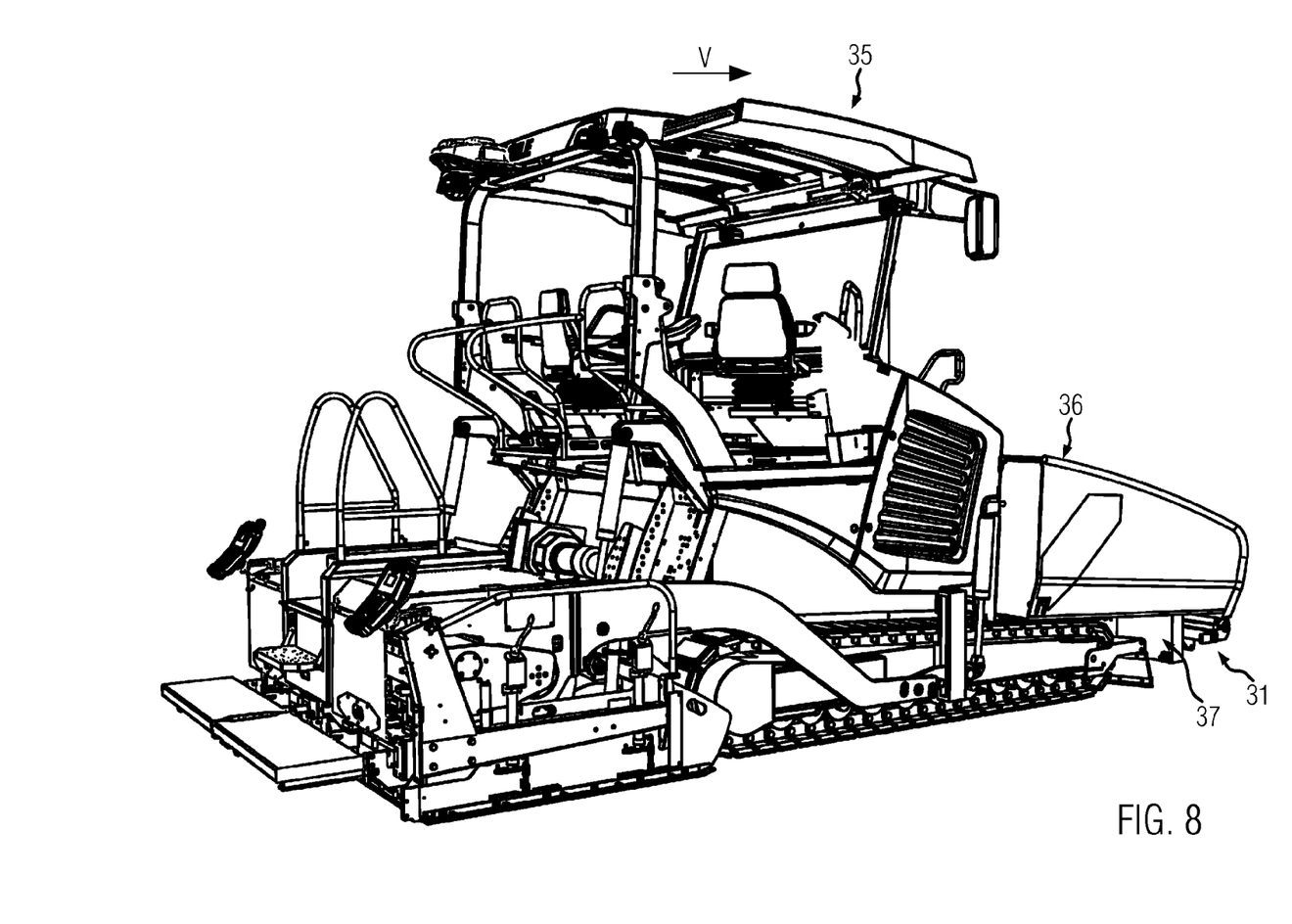
FIG. 8 shows a road finisher having a docking unit according to FIG. 7.
Figure 9:
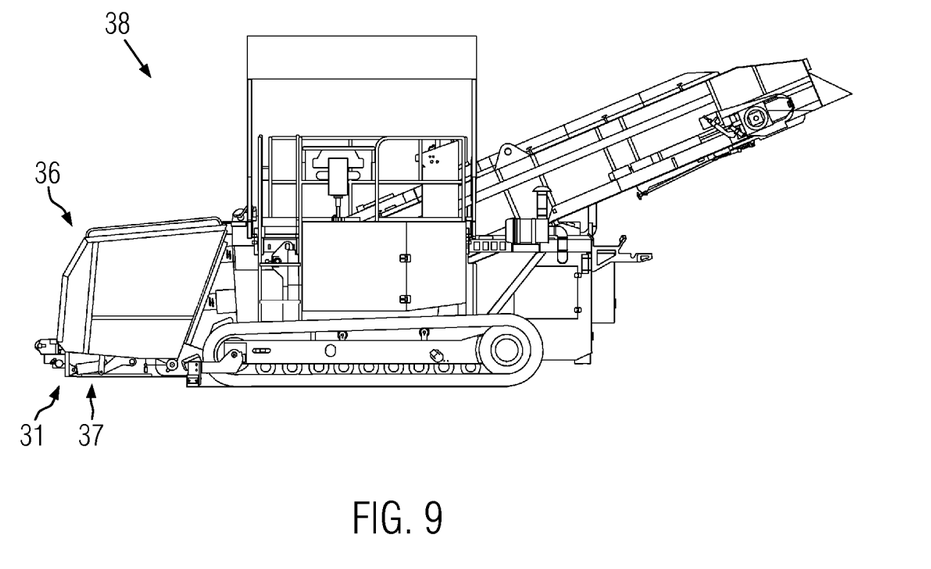
FIG. 9 shows a charger having a docking unit according to FIG. 7.

FIG. 7 shows a docking unit 31 which may be fixed to a road finisher 35 according to FIG. 8, respectively, to a charger 38 according to FIG. 9. The docking unit 31 comprises a push-bar 32 on which push-rollers 33 are rotatably mounted. During the charging, the push-rollers 33 may push against a truck driving in front thereof to push same forwards in front of the charger 38, respectively, road finisher 35. The docking unit 31 further comprises a cross-member 34 fixable to the chassis, on which two of the damper devices 1 according to the disclosure are attached. The respective piston rods 4 are fixed to the push-bars 32. Corresponding to the forces acting on the push-bar 32 the damper devices 1 can be retracted or extended independently of each other. The cross-member 34 which, according to FIG. 7, forms part of the docking unit 31 could just as well be designed as a chassis component of the road finisher 35 or charger 38, with the respective damper devices 1 being fixable thereto in a detachable manner.

FIG. 8 shows a road finisher 35 with a material hopper 36 and a chassis 37. The docking unit 31 is fixed to the chassis 37 and, seen in the driving direction V, projects in the front, underneath the material hopper 36, by a predetermined length so as to be docked to the back tires of a truck driving in the front when same moves towards the road finisher 35 for material charging.

FIG. 9 shows a charger 38. The charger 38, too, comprises a material hopper 36, like the road finisher 35. The docking unit 31 shown in FIG. 7 is fixed to the chassis 37 of the charger 38 in the front, underneath the material hopper 36, so as to be docked to the back tires of a truck driving in the front.

Figure 10:
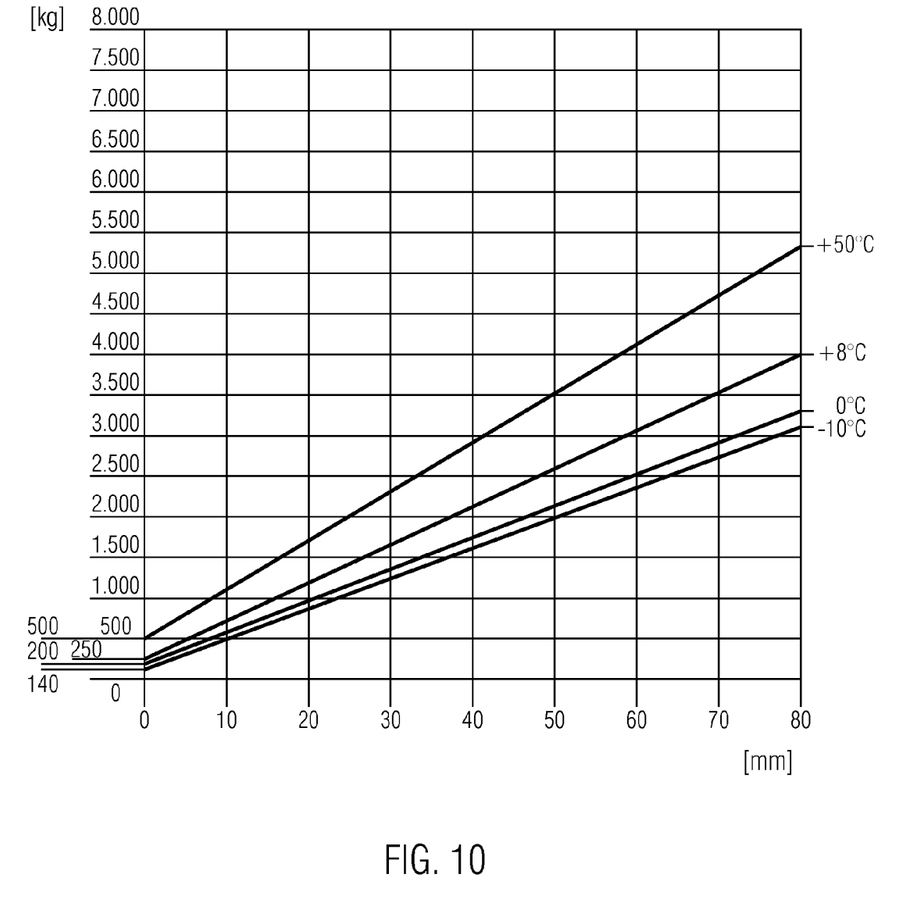
FIG. 10 shows a force-distance diagram for the damper device according to the disclosure.

FIG. 10 shows a force-distance diagram for the damper device 1 according to the disclosure. The push-in length of the piston rod 4 into the cylinder 2 is represented along the horizontal abscissa in [mm], and the force is represented along the vertical abscissa in [daN/kg]. For representing the force-distance characteristics the spring element 18 comprised eleven disc springs (70×35.5×4), with an arrangement of spring packs in the same direction, including three springs once and two springs three times, and of one spring twice in the opposite direction. A completely tensioned spring stack results in a maximum spring pretensioning force of 9273 daN. The damper device 1 according to the disclosure was tested at temperatures of −10° C., 0° C., +8° C. and +50° C. As can be easily seen in FIG. 10 the respective force-distance characteristics show a linear behavior and rise each from an initial force, at which the piston rod 4 is completely moved out of cylinder 2, up to a maximum block force, at which the piston rod 4 is maximally pushed into the cylinder 2. The piston rod 4 commenced, for example at a temperature of +8° C. of the liquid 7, starting out from an initial force of 250 daN, to move into the cylinder 2 of the damper device 1, with the force-distance characteristic rising linearly up to a maximum block force of 4000 daN, with a push-in length of the piston rod 4 of 80 mm.

Despite the strongly varying temperatures of the enclosed liquid 7 the linear force-distance characteristics according to FIG. 10 substantially show a similar behavior, which is achieved by the bulkhead 19 floating in the cylinder 2. Thus, it is possible that the damper device 1 according to the disclosure, even when used in different temperature situations, maintains a nearly constant damping characteristic, so that the charging of a road finisher 35, respectively, charger 38 according to FIGS. 8 and 9 can be accomplished in an improved manner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A road finisher or a charger comprising:
a chassis;
a material hopper; and
a damper device fixed to the chassis and carrying a push-bar to which a material supply vehicle can be docked in order to fill the material hopper, the damper device comprising:
a cylinder;
a piston bearing on one side of the cylinder;
a piston rod displaceably received by the piston bearing; and
and a bottom unit on another side of the cylinder;
wherein the cylinder, the piston bearing and the bottom unit form a closed chamber that is filled with a compressible liquid, the piston rod is configured to divide the chamber into first and second chamber halves between which the liquid can be displaced if the piston rod is displaced relative to the cylinder, and the closed chamber has a variable volume so as to compensate temperature-induced pressure fluctuations inside the chamber.

2. The road finisher or the charger of claim 1 wherein the bottom unit comprises a bulkhead that is displaceably arranged inside the cylinder.

3. The road finisher or the charger of claim 2 wherein the bottom unit further comprises a lid and a spring element, the spring element being arranged between the lid and the bulkhead.

4. The road finisher or the charger of claim 3 wherein the bulkhead comprises an end section and a guiding section, the guiding section having a greater outer diameter than the end section.

5. The road finisher or the charger of claim 4 wherein the bulkhead provides a seat between the end section and the guiding section to which the spring element can be coupled.

6. The road finisher or the charger of claim 3 wherein the spring element comprises at least one disc spring.

7. The road finisher or the charger of claim 2 wherein the bulkhead is mounted relative to the cylinder in a non-rotating manner.

8. The road finisher or the charger of claim 2 wherein the bulkhead is formed as a hollow body defining a part of the chamber volume of the damper device.

9. The road finisher or the charger of claim 1 wherein the piston rod comprises a piston plate that is displaceable inside the cylinder between the piston bearing and the bottom unit.

10. The road finisher or the charger of claim 9 wherein the piston plate includes at least one throttling port.

11. The road finisher or the charger of claim 10 wherein a valve member is arranged in at least one of the throttling ports.

12. The road finisher or the charger of claim 1 wherein the compressible liquid is a silicone.

13. The road finisher or the charger of claim 1 wherein the piston rod is pretensioned relative to the piston bearing by the compressible liquid.

14. The road finisher or the charger of claim 1 wherein the cylinder and/or the bottom unit comprise/comprises a vent hole through which air can flow out of or into the damper device if the chamber volume changes.

15. The road finisher or the charger according to claim 1 wherein the push-bar forms part of a docking unit that projects forwardly of the material hopper.

16. A road finisher or a charger comprising:
a chassis;
a material hopper; and
a damper device fixed to the chassis and carrying a push-bar to which a material supply vehicle can be docked in order to fill the material hopper, the damper device comprising:
a cylinder;
a piston bearing on one end of the cylinder;
a piston rod displaceably received by the piston bearing; and
a bottom unit on another end of the cylinder;
wherein the cylinder, the piston bearing and the bottom unit form a closed chamber that is filled with a compressible liquid, the piston rod is configured to divide the chamber into first and second chamber portions between which the liquid can be displaced if the piston rod is displaced relative to the cylinder, and the closed chamber has a variable volume so as to compensate for temperature-induced pressure fluctuations inside the closed chamber.

17. The road finisher or the charger according to claim 16 wherein the push-bar forms part of a docking unit that projects forwardly of the material hopper.

18. The road finisher or the charger of claim 16 wherein the bottom unit comprises a bulkhead that is displaceably arranged inside the cylinder, the bulkhead being displaceable with respect to the piston rod.

19. The road finisher or the charger of claim 18 wherein the bottom unit further comprises a lid and a spring element, the spring element being arranged between the lid and the bulkhead.

20. The road finisher or the charger of claim 18 wherein the bulkhead is mounted relative to the cylinder in a non-rotating manner.

* * * * *

UNITED STATES PATENT AND TRADEMARK OFFICE
CERTIFICATE OF CORRECTION

PATENT NO. : 9,702,427 B2
APPLICATION NO. : 14/683497
DATED : July 11, 2017
INVENTOR(S) : Eckhard Petersmann et al.

It is certified that error appears in the above-identified patent and that said Letters Patent is hereby corrected as shown below:

On the Title Page

Insert:
--(30)   Foreign Application Priority Data
April 11, 2014           (EP)     14164376--

In the Claims

Column 9, Line 25, Claim 1:
Before "a bottom unit"
Delete "and"

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*